United States Patent
Veprinsky et al.

(10) Patent No.: US 11,372,682 B2
(45) Date of Patent: Jun. 28, 2022

(54) METHOD AND SYSTEM FOR DEADLINE INHERITANCE FOR RESOURCE SYNCHRONIZATION

(71) Applicant: EMC IP Holding Company LLC, Hopkinton, MA (US)

(72) Inventors: Alexandr Veprinsky, Brookline, MA (US); Felix Shvaiger, Nashua, NH (US); Anton Kucherov, Dudley, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 138 days.

(21) Appl. No.: 16/815,265

(22) Filed: Mar. 11, 2020

(65) Prior Publication Data

US 2020/0210240 A1 Jul. 2, 2020

Related U.S. Application Data

(63) Continuation of application No. 14/872,075, filed on Sep. 30, 2015, now Pat. No. 10,628,221.

(51) Int. Cl.
*G06F 9/50* (2006.01)
(52) U.S. Cl.
CPC .................. *G06F 9/5038* (2013.01)
(58) Field of Classification Search
CPC .................................................... G06F 9/5038
See application file for complete search history.

(56) References Cited

U.S. PATENT DOCUMENTS

| | | |
|---|---|---|
| 5,872,938 A | 2/1999 | Williams |
| 7,886,300 B1 | 2/2011 | Long et al. |
| 2002/0083063 A1 | 6/2002 | Egolf |
| 2004/0230675 A1 | 11/2004 | Freimuth et al. |
| 2009/0006257 A1 | 1/2009 | Scheel |
| 2014/0040904 A1 | 2/2014 | Giusto et al. |
| 2014/0379924 A1 | 12/2014 | Das et al. |
| 2015/0058858 A1* | 2/2015 | Plattner .................. G06F 9/5038 718/103 |
| 2015/0309874 A1 | 10/2015 | Liang et al. |

* cited by examiner

*Primary Examiner* — Emerson C Puente
*Assistant Examiner* — Jonathan R Labud
(74) *Attorney, Agent, or Firm* — Ryan, Mason & Lewis, LLP

(57) ABSTRACT

Example embodiments of the present invention provide a method, a system, and a computer program product for managing tasks in a system. The method comprises running a first task on a system, wherein the first task has a first priority of execution time and the execution of which first task locks a resource on the system, and running a second task on the system, wherein the second task has a second priority of execution time earlier than the first priority of execution time of the first task and the execution of which second task requires the resource on the system locked by the first task. The system then may promote the first task having the later first priority of execution time to a new priority of execution time at least as early as the second priority of execution time of the second task and resume execution of the first task having the later first priority of execution time.

20 Claims, 8 Drawing Sheets

$T_0$ $T_1$ $T_2$ $T_3$

METHOD AND SYSTEM FOR DEADLINE INHERITANCE FOR RESOURCE SYNCHRONIZATION

RELATED APPLICATION(S)

The present application is a continuation of U.S. patent application Ser. No. 14/872,075, filed Sep. 30, 2015, now issued as U.S. Pat. No. 10,628,221, and entitled "Method and System for Deadline Inheritance for Resource Synchronization," which is incorporated by reference herein in its entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to data storage systems and, in particular, to the field of task scheduling for multiprocessing computerized systems.

BACKGROUND

A data storage system can include several independent processors that cooperate to increase throughput of the many tasks associated with data storage and retrieval. These processors typically communicate with each other by leaving messages in a shared memory. This shared memory is constantly available to the processors for reading and writing.

Certain tasks performed by the processors require that each processor utilize a particular shared resource to the exclusion of the other processors. When a processor is using such a shared resource, it is important for the other processors to be informed that another processor is using the resource and that the resource is not currently available for use by the other processors.

Current systems that communicate the availability of a shared resource to the processors are software-based. As stated above, one approach to providing such communication is to enable the processors to leave messages in the shared memory. However, because the memory is shared, it is possible for a race condition between processors to occur. In such cases, one processor could inadvertently overwrite a message left by another processor. This can result in the two processors attempting to use the same shared resource at the same time.

Another approach involves requiring that a processor that is requesting access to the shared resource first check the resource to determine if it is available and then, if the resource is available, posting a claim to exclusive access to the resource. After a period of time, the processor then checks the resource to insure that it has gained access to the resource and that another processor did not gain access before the processor was able to post its claim to the resource. This process can require a significant amount of time for a processor to obtain exclusive access to the shared resource.

SUMMARY

Example embodiments of the present invention provide a method, a system, and a computer program product for managing tasks in a system. The method comprises running a first task on a system, wherein the first task has a first priority of execution time and the execution of which first task locks a resource on the system, and running a second task on the system, wherein the second task has a second priority of execution time earlier than the first priority of execution time of the first task and the execution of which second task requires the resource on the system locked by the first task. The system then may promote the first task having the later first priority of execution time to a new priority of execution time at least as early as the second priority of execution time of the second task and resume execution of the first task having the first priority of execution time.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
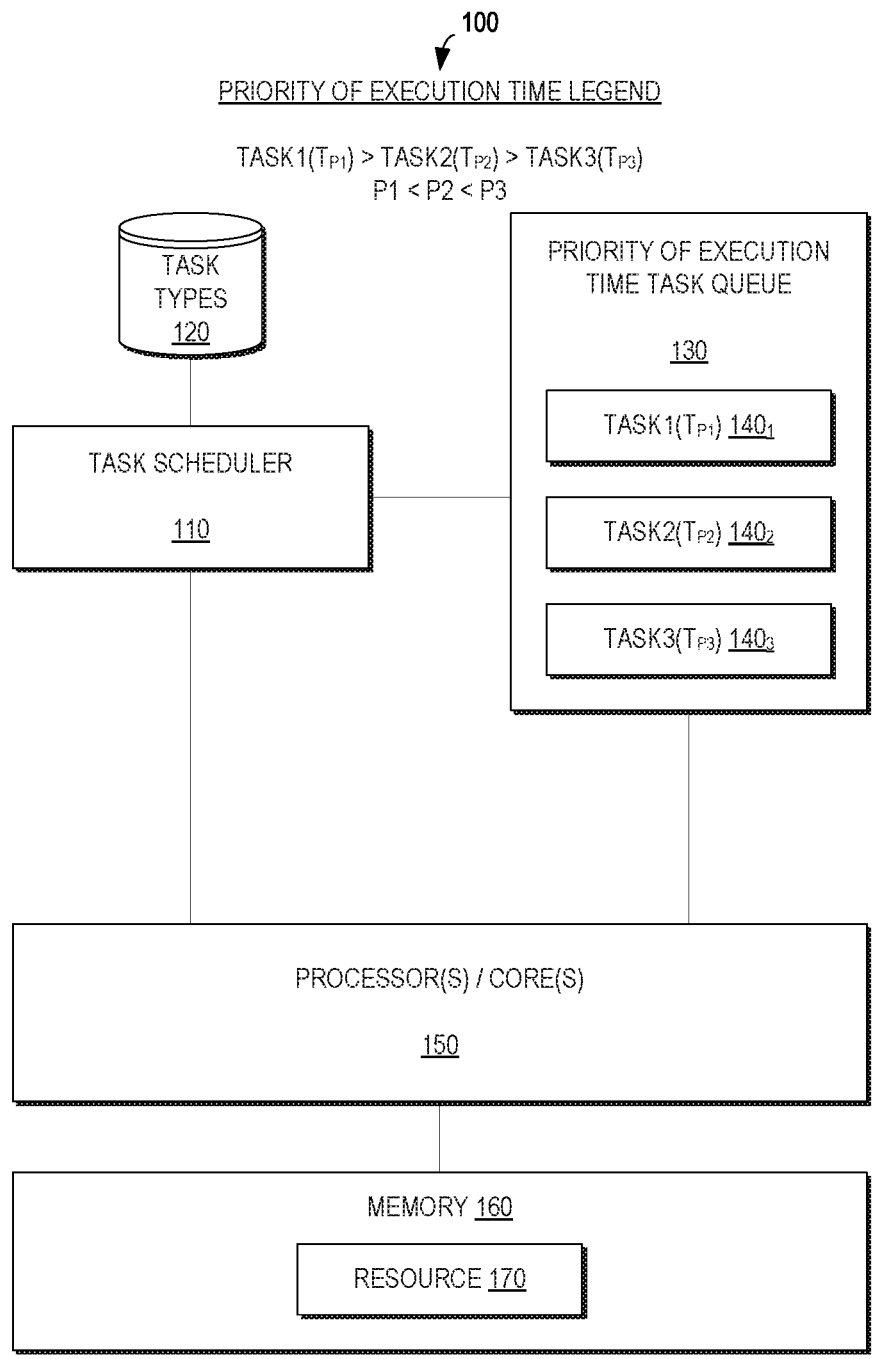
FIGS. 1 and 2A-2C are block diagrams of respective states of task management by a task scheduler in a multiprocessing system according to respective example embodiments of the present invention.

In traditional multiprocessing systems, as understood in the art, a task runs until it finishes or until it cannot run any longer (e.g., if a resource is not available). For example, in a traditional multiprocessing system having three tasks with Task1 having a higher user priority than Task2, and Task2 having a higher user priority than Task3, if Task2 is running, Task1 may preempt Task2 because Task1 has a higher user priority. However, if for some reason neither Task1 nor Task2 is ready to run (e.g., some resource is not available), as understood in the art, Task3 will be pulled out of the queue and start running, thereby locking the resource in memory required by Task3. Later, as understood in the art, if Task1 becomes ready to run on the same processor as Task3, by virtue of its higher priority, Task1 will preempt Task3 and start running; however, as understood in the art, Task1 will find the resource is locked by Task3 (which cannot run because it has a lower user priority than Task1). Likewise, it should be understood that if Task1 becomes ready to run on a different processor/core than Task3, Task1 will find the resource is locked by Task3 and go back into the queue. Therefore, as understood in the art, in traditional multiprocessing systems, Task1 gives up and allows Task3 to run and eventually release the resource needed by Task1. However, as understood in the art, it is possible that, while Task1 is waiting for Task3 to release the resource, Task2 may start running and, because it has a higher priority, may preempt Task3 (which Task1 yielded to in order to have the resource released). In this situation, in traditional multiprocessing systems, Task1 is now waiting for Task2 to complete which is not optimal as Task1 has a higher priority than Task2.

A traditional solution to this problem is known in the art as "priority inversion" in which the priority of lower priority running tasks is elevated to the priority of the higher-priority task actively waiting for the locked resource. As understood in the art and continuing with the example above, if Task3 runs and locks the resource which Task1 will need, Task2 may start running and preempt Task3 which, in turn, may be preempted by Task1 when it starts running. As understood in the art, Task3 may temporarily be assigned the same priority as Task1 (until Task3 finishes) so Task3 can complete and release the resource Task1 needs to run. Therefore, as understood in the art, the holder of a resource lock (e.g., Task3) will inherit the priority of the highest-priority task waiting for the locked resource (e.g., Task1). However, as understood in the art, priority inversion assumes knowledge about which tasks are more important relative to each other which presents significant management overhead in such multiprocessing systems.

Example embodiments of the present invention, however, do not require such knowledge and, instead, provide a priority task queue 130 (FIG. 1) based on task time of execution (i.e., a desired time at which the task should run). In other words, example embodiments of the present invention provide a new priority scheme that supersedes traditional notions of priority and decouples order of execution of tasks from user priority of tasks by supplanting a task's user priority with a time to execute priority. Example embodiments of the present invention provide a method, a system, and a computer program product for managing tasks in a system. As will be described in greater detail below, the method comprises running a first task on a system, wherein the first task has a first later priority of execution time (and, therefore, a lower priority) and the execution of the first task locks a resource on the system, and running a second task on the system, wherein the second task has a second earlier priority of execution time earlier than the first priority of execution time of the first task (and, therefore, a higher priority than the first task) and the execution of the second task requires the resource on the system locked by the first task. The system then may promote the first task having the later first priority of execution time to a new priority of execution time at least as early as the second higher priority of execution time of the second task and resume execution of the first task having the later first priority of execution time. In other words, example embodiments of the present invention may rearrange the execution order of tasks in a priority of execution time task queue based on a time to execute.

FIG. 1 is a block diagram of a multiprocessing system 100 in a first state at time $T_0$. As illustrated in FIG. 1, a task scheduler 110 may maintain a priority of execution time task queue 130 including, for example, three tasks $140_1$-$140_3$ (140 generally). As illustrated in FIG. 1, the system 100 also may include a data store of task types 120, for example as described below with reference to task types 220 of FIGS. 2A-2C. As understood in the art, the tasks 140 may be assigned by the task scheduler 110 for execution on one or more processors or cores 150. In certain situations, one or more of the tasks may rely on a resource 170 stored in memory 160 made available to the executing tasks 140.

As illustrated in FIG. 1, the tasks 140 have respective priorities of execution time, with Task1 $140_1$ having an earlier priority of execution time ($T_{P1}$) (i.e., a high priority), Task2 $140_2$ having an intermediate priority of execution time ($T_{P2}$) (i.e., an intermediate priority), and Task3 $140_3$ having a later priority of execution time ($T_{P3}$) (i.e., a lower priority) (as illustrated in the priority of execution time legend with Task1 $140_1$ having a higher priority than Task2 $140_2$ based on priority of execution time and Task2 $140_2$ having a high priority than Task3 $140_3$ based on priority of execution time. As will be described in greater detail below, the priority of execution time task queue may be a priority of execution time task queue 130 wherein the tasks 140 are ordered according to a time at which it is desired that the tasks 140 execute. It should be understood that, in a preferred embodiment, this time of execution is independent of the system clock time of the system 100 and that a task 140 may execute before or after the priority time (e.g., $T_{P1}$, $T_{P2}$, $T_{P3}$) but that the priority time defines the relative priority of the tasks 140 in the queue 130.

Figure 2A:
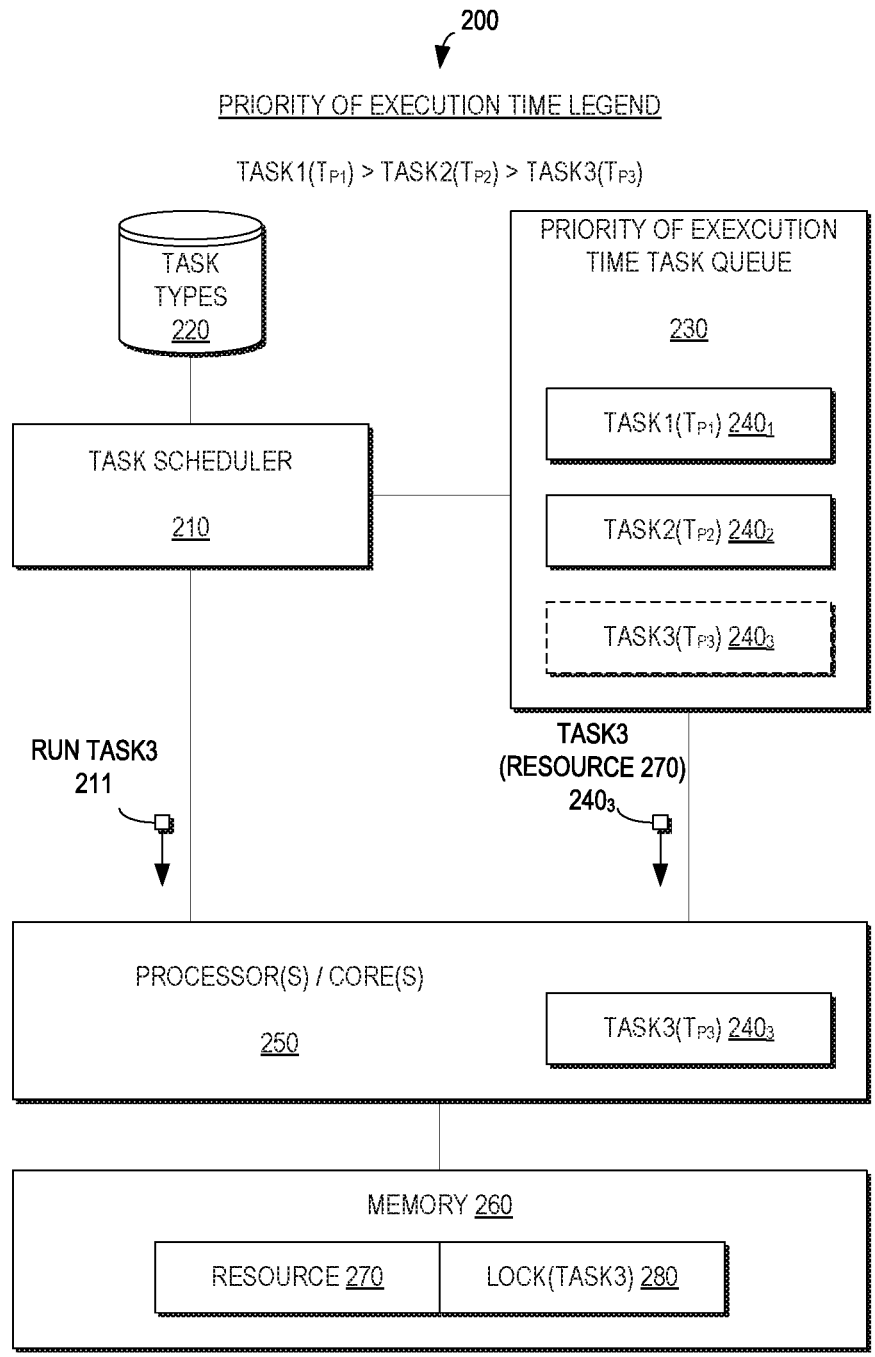
Figure 2B:
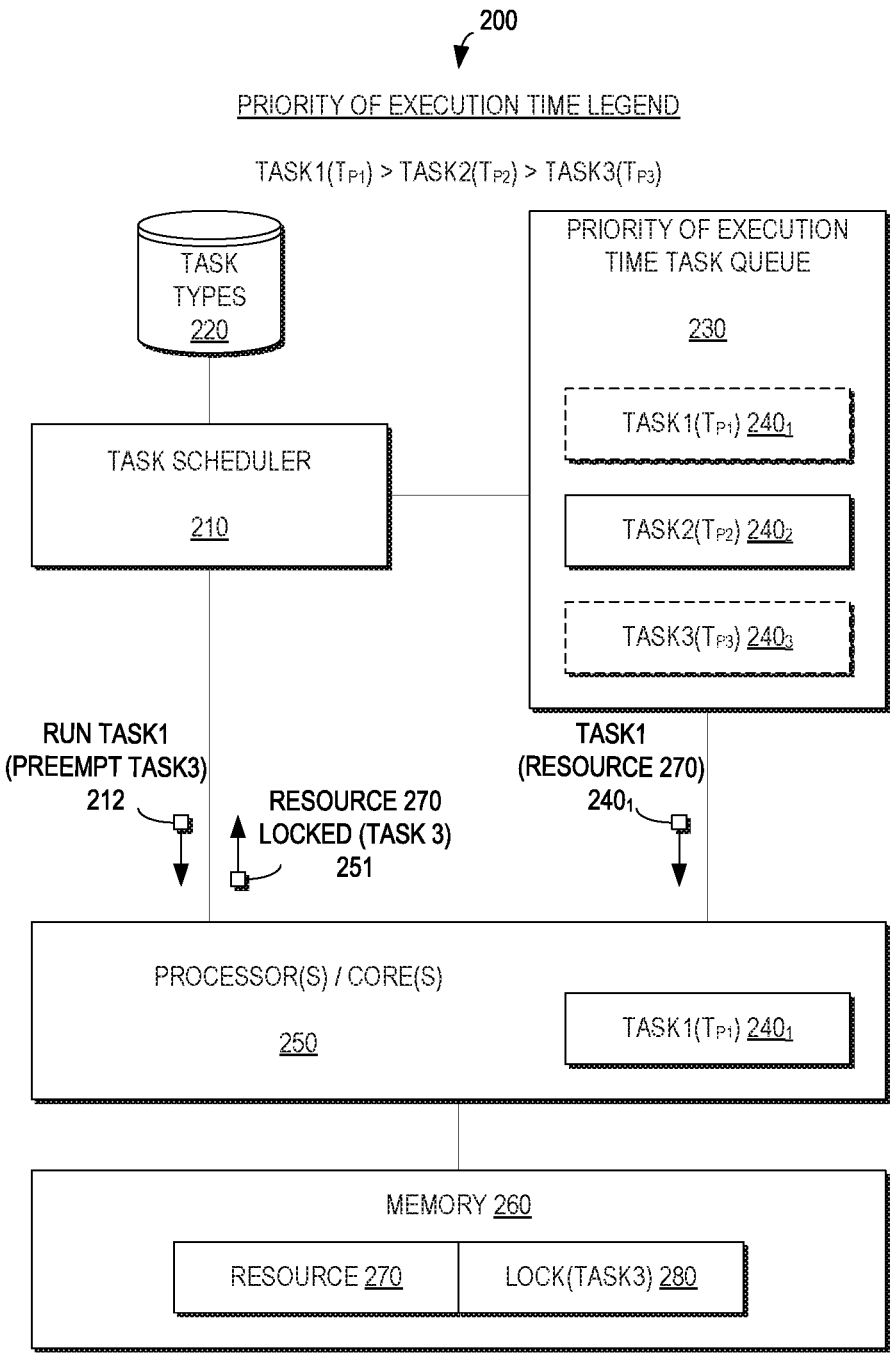
Figure 2C:
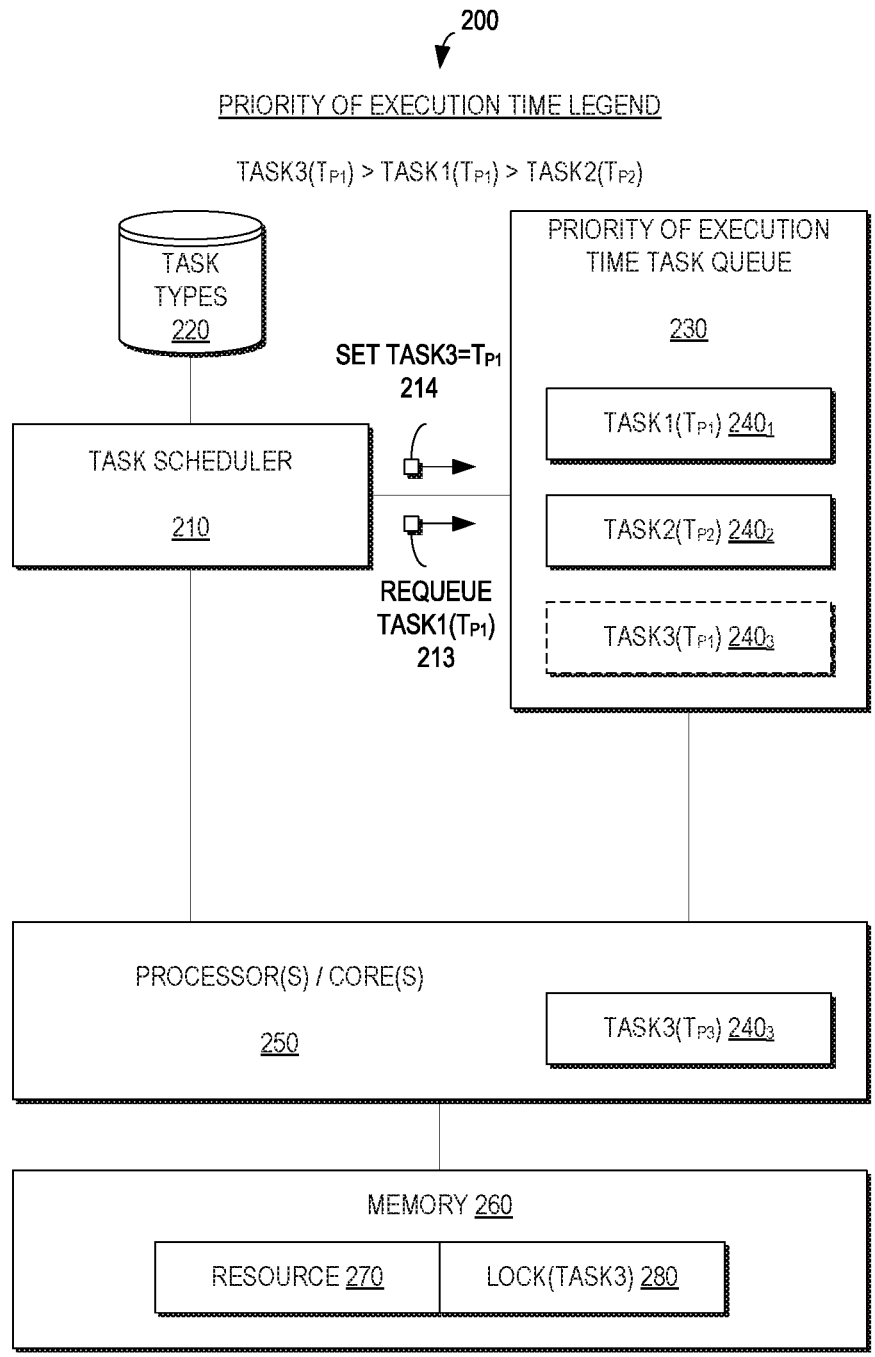
Figure 3:
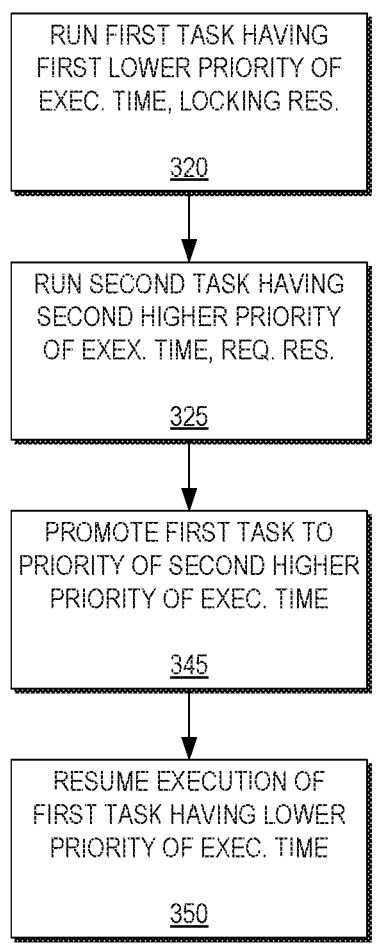
FIGS. 3-6 are flow diagrams illustrating methods according to example embodiments of the present invention.
Figure 4:
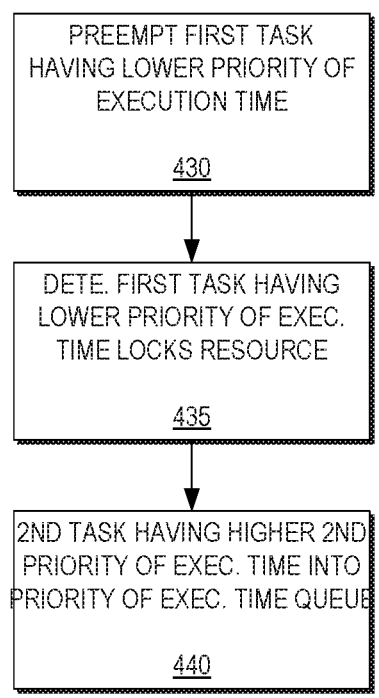

FIGS. 2A-2C are block diagrams of a multiprocessing system 200 (e.g., the multiprocessing system 100 of FIG. 1) in respective states at times $T_1$, $T_2$, and $T_3$. FIGS. 3-4 are flow diagrams illustrating respective methods according to example embodiments of the present invention. FIGS. 2A-2C, 3, and 4 may be described in conjunction.

As illustrated in FIGS. 2A and 3, at time $T_1$, the system 200 may run Task3 $240_3$ (i.e., a first task) which has a later priority of execution time (e.g., here, later and, therefore, a lower priority than that of both Task1 $240_1$ and Task2 $240_2$) and which requires a resource 270 in memory 260 (320). The task scheduler 210 may schedule 211 the processor 250 to run Task3 $240_3$. The processor 250 then may load Task3 $240_3$ (having a priority of execution time of $T_{P3}$) from the priority of execution time task queue 230 (as indicated by the hashed lines around Task3 $240_3$ in the priority of execution time task queue 230, the box and arrow for Task3 $240_3$ from the priority of execution time task queue 230 to the processor 250, and the solid line around Task3 $240_3$ in the processor 250). Accordingly, Task3 $240_3$ places a lock 280 on resource 270 attributable to Task3 $240_3$.

As illustrated in FIGS. 2B and 3, at time $T_2$, the system 200 may run Task1 $240_1$ (i.e., a second task) which has an earlier priority of execution time (e.g., here, earlier and, therefore, a higher priority than that of Task3 $240_3$ (i.e., the first task)) and which also requests the resource 270 in memory 260 (i.e., the resource on the system locked by the first task) (325). As illustrated in FIGS. 2B and 4, the task scheduler 210 may schedule 212 the processor 250 to run Task1 $240_1$ and preempt Task3 $240_3$ (i.e., the first task having the later priority of execution time) to begin execution of Task1 $240_1$ (i.e., the second task having the earlier priority of execution time) (430). The processor 250 then may load Task1 $240_1$ (having a priority of execution time of $T_{P1}$ which has an earlier priority of execution time (i.e., a higher priority) than the priority of execution time of $T_{P3}$ for Task3 $240_3$) from the priority of execution time task queue 230 (as indicated by the hashed lines around Task1 $240_1$ in the priority of execution time task queue 230, the box and arrow for Task1 $240_1$ from the priority of execution time task queue 230 to the processor 250, and the solid line around Task1 $240_1$ in the processor 250). However, because Task1 $240_1$, too, requires use of resource 270 in memory 260, as illustrated in FIGS. 2B and 4, the processor 250 may determine that Task3 $240_3$ (i.e., the first task with the later priority of execution time) locks the resource 270 on the system 200 (435) and reports 251 back to the task scheduler 210 that the resource 270 is locked 280 by Task3 240$_3$. Accordingly, as illustrated in FIGS. 2C and 4, at time T$_3$, because Task1 240$_1$ failed to run as a result of the lock 280 on the resource 270 from Task3 240$_3$, the task scheduler 210 may requeue 213 Task1 240$_1$ (i.e., reinsert the second task having the earlier priority of execution time and, therefore, the higher priority) in the priority of execution time task queue 230 with its original priority of execution time T$_{P1}$ (as indicated by the solid lines around Task1 240$_1$ in the priority of execution time task queue 230) for subsequent execution according to its earlier priority of execution time (440).

Additionally, as illustrated in FIGS. 2C and 3, at time T$_3$, the task scheduler 210 may set 214 Task3 240$_3$ to have the same priority of execution time T$_{P1}$ as Task1 240$_1$; in other words, the task scheduler 210 may promote the first task having the later priority of execution time to a new priority of execution time at least as early as the second earlier priority of execution time of the second task (345) and resume execution (350) of the first task on the processor 250. Thus, as shown in the task priority legend, Task3 240$_3$ now has the earliest priority of execution time T$_{P1}$ (inherited from Task1 240$_1$) as it is currently executing on the processor 250, followed by Task1 240$_1$ having the same priority of execution time T$_{P1}$, with Task2 240$_2$ having the latest priority of execution time T$_{P2}$ and, therefore, the lowest priority. Therefore, it should be understood that, a condition cannot arise under which Task1 240$_1$ waits for Task3 240$_3$ to release its lock 280 on a resource 270 and Task2 240$_2$ starts running and preempts Task3 240$_3$ (thereby causing Task1 240$_1$ to depend on the execution of Task2 240$_2$ despite its earlier priority of execution time) because the priority of execution time T$_{P2}$ for Task2 240$_2$ is later than the priority of execution time T$_{P3}$ for Task3 240$_3$.

Figure 5:
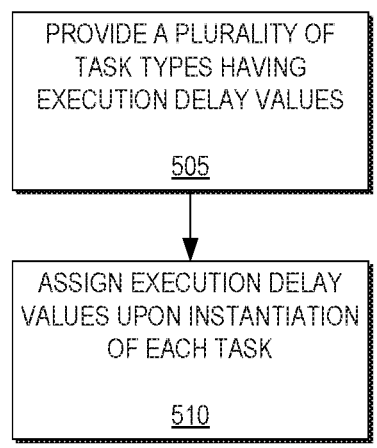
Figure 6:
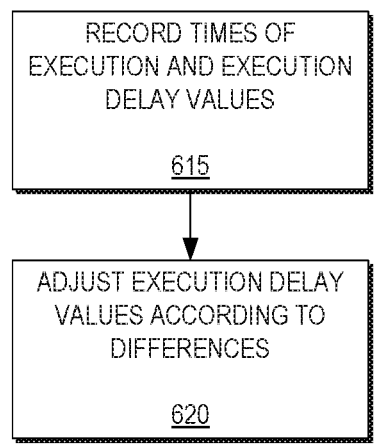

FIGS. 5-6 are flow diagrams illustrating respective methods according to example embodiments of the present invention and may be described with reference to FIGS. 2A-2C. As illustrated in FIGS. 2A-2C, the system 200 also may include a data store of task types 220 having execution delay values (505). In certain embodiments, the store of task types 220 may include a table identifying a plurality of tasks types, attributes of each respective task type (including execution delay values), and statistics regarding the execution of tasks having the respective task types. For example, the task scheduler 210 may assign an execution delay value upon instantiation of each task in the priority task queue 230 (510), such as by giving each task a task type (e.g., from the store of task types 220).

For example, the store of task types 220 may have three types of tasks: Type1 runs now, Type2 runs in 1 second, and Type3 runs in 1 minute. First, the task scheduler 210 may instantiate a first task of Type1 (now) and insert it into the queue 230 and then create a second task of Type1 (now) and insert it into the queue 230 after the first task (i.e., the first task was created earlier so it gets to run earlier as both the first task and the second task have the same task type and, therefore, the same execution delay value). The task scheduler 210 then may create a third task of Type2 (1 s) which is inserted down the queue 230. Before one minute has passed, the task scheduler 210 creates a fourth task of Type1 (now), which is inserted in the queue 230 ahead of the third task of Type2 (1 s), and a fifth task of Type3 (1 m), which is inserted after the third task. Accordingly, controlling the delay time and therefore the time of execution allows the system 200 to determine the priority of the tasks as the queue 230 is sorted by the desired time of execution of the tasks.

As tasks 240 are executed from the priority of execution time task queue 230, the task scheduler 210 may record the times of execution of the tasks 240 and the execution delay values assigned to the tasks 240 upon their instantiation into the priority task queue 230 (615). The task scheduler 210 then may adjust the execution delay values assigned to the task types according to differences calculated between the times of execution of the tasks and the execution delay values assigned to the tasks (620). In certain embodiments, the task scheduler 210 may change the execution delay values for task types. In other embodiments, the task scheduler 210 may reorder the tasks 240 in the queue 230 by changing their times of execution.

Figure 7:
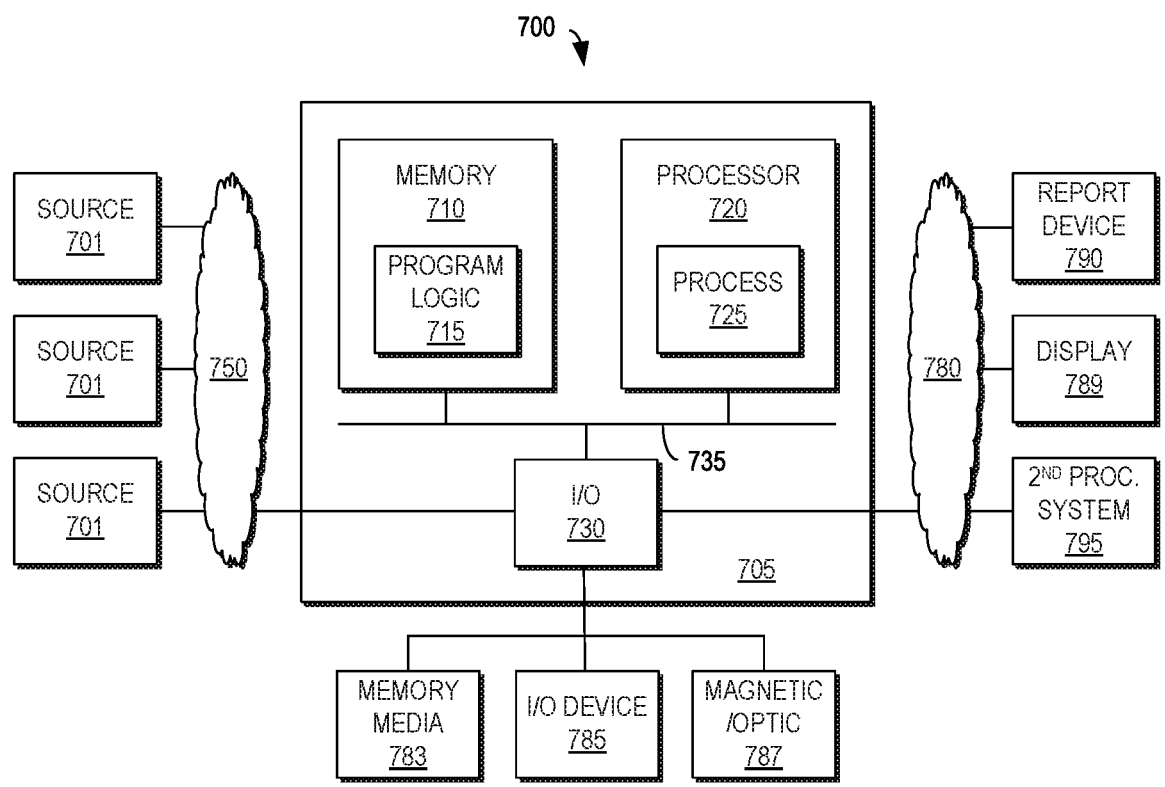
FIG. 7 is a block diagram of a system according to an example embodiment of the present invention.

FIG. 7 is a block diagram of an example embodiment apparatus 705 according to the present invention. The apparatus 705 may be part of a system 700 and includes memory 710 storing program logic 715, a processor 720 for executing a process 725, and a communications I/O interface 730, connected via a bus 735. The apparatus 705 is configured to communicate with memory media 783, I/O devices 785, and magnetic or optical (magnetic/optic) drives 787 via the communications I/O interface 730. The apparatus 705 is configured to communicate with a plurality of sources 701 via a network 750 using communications I/O interface 730. The apparatus 705 is further configured to communicate with a display 789, a report device 790, and a second processing system 795 via a network 780 using communications I/O interface 730.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 9, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 8:
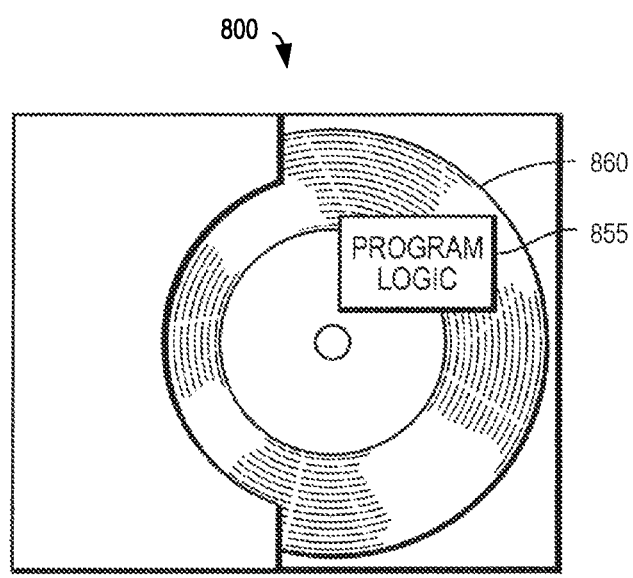
FIG. 8 is an illustration of an example embodiment of the present invention embodied in computer program code.

FIG. 8 is a block diagram of a computer program product 800 including program logic 855, encoded on a computer-readable medium 860 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
    obtaining a first task;
    queuing the first task in a queue of tasks to be executed by at least one processing device comprising a processor coupled to memory, the queuing of the first task comprising:
        determining that the first task has a first task type of a plurality of task types;
        determining a first priority of execution time modifier for the first task based at least in part on the first task type; and
        adding the first task to the queue with a first priority of execution time, the first priority of execution time being determined based at least in part on the first priority of execution time modifier and a first queue time at which the first task is added to the queue;
    obtaining a second task;
    queuing the second task in the queue of tasks, the queuing of the second task comprising:
        determining that the second task has a second task type of the plurality of task types;
        determining a second priority of execution time modifier for the second task based at least in part on the second task type; and
        adding the second task to the queue with a second priority of execution time, the second priority of execution time being determined based at least in part on the second priority of execution time modifier and a second queue time at which the second task is added to the queue;
    executing the first task from the queue in accordance with the first priority of execution time; and
    executing the second task from the queue in accordance with the second priority of execution time;
    wherein the second priority of execution time is earlier than the first priority of execution time;
    wherein the second queue time is later than the first queue time; and
    wherein the method is implemented by the at least one processing device.

2. The method of claim 1 wherein determining the first priority of execution time modifier comprises:
    identifying an entry of a plurality of entries in a priority of execution time data structure based at least in part on the first task type, the plurality of entries each comprising a given task type of the plurality of task types and given priority of execution time modifier corresponding to the given task type; and
    determining the first priority of execution time modifier based at least in part on the identified entry.

3. The method of claim 1 wherein the first priority of execution time modifier comprises a first amount of time to delay the execution of the first task from the first queue time.

4. The method of claim 3 wherein:
    the second priority of execution time modifier comprises a second amount of time to delay the execution of the second task from the second queue time; and
    the second amount of time is less than the first amount of time.

5. The method of claim 4 wherein the second amount of time is zero and the second priority of execution time is equal to the second queue time based at least in part on the second amount of time being zero.

6. The method of claim 4 wherein a sum of the second queue time and the second amount of time is less than a sum of the first queue time and the first amount of time.

7. The method of claim 6 further comprising:
    determining an execution time at which the first task is executed by the at least one processing device; and
    adjusting the first amount of time of the first priority of execution time modifier in a priority of execution time data structure based at least in part on the execution time.

8. The method of claim 7 wherein a sum of the second queue time and the second amount of time is greater than a sum of the first queue time and the adjusted first amount of time.

9. An apparatus comprising:
    at least one processing device comprising a processor coupled to a memory, the at least one processing device being configured:
        to obtain a first task;
        to queue the first task in a queue of tasks to be executed by the at least one processing device, the queuing of the first task comprising:
            determining that the first task has a first task type of a plurality of task types;
            determining a first priority of execution time modifier for the first task based at least in part on the first task type; and
            adding the first task to the queue with a first priority of execution time, the first priority of execution time being determined based at least in part on the first priority of execution time modifier and a first queue time at which the first task is added to the queue;
        to obtain a second task;
        to queue the second task in the queue of tasks, the queuing of the second task comprising:
            determining that the second task has a second task type of the plurality of task types;
            determining a second priority of execution time modifier for the second task based at least in part on the second task type; and
            adding the second task to the queue with a second priority of execution time, the second priority of execution time being determined based at least in part on the second priority of execution time modifier and a second queue time at which the second task is added to the queue;
        to execute the first task from the queue in accordance with the first priority of execution time; and
        to execute the second task from the queue in accordance with the second priority of execution time:
        wherein the second priority of execution time is earlier than the first priority of execution time; and
        wherein the second queue time is later than the first queue time.

10. The apparatus of claim 9 wherein determining the first priority of execution time modifier comprises:
   identifying an entry of a plurality of entries in a priority of execution time data structure based at least in part on the first task type, the plurality of entries each comprising a given task type of the plurality of task types and given priority of execution time modifier corresponding to the given task type; and
   determining the first priority of execution time modifier based at least in part on the identified entry.

11. The apparatus of claim 9 wherein the first priority of execution time modifier comprises a first amount of time to delay the execution of the first task from the first queue time.

12. The apparatus of claim 11 wherein:
   the second priority of execution time modifier comprises a second amount of time to delay the execution of the second task from the second queue time; and
   the second amount of time is less than the first amount of time.

13. The apparatus of claim 12 wherein the second amount of time is zero and the second priority of execution time is equal to the second queue time based at least in part on the second amount of time being zero.

14. The apparatus of claim 12 wherein a sum of the second queue time and the second amount of time is less than a sum of the first queue time and the first amount of time.

15. The apparatus of claim 14 wherein the at least one processing device is further configured:
   to determine an execution time at which the first task is executed by the at least one processing device; and
   to adjust the first amount of time of the first priority of execution time modifier in a priority of execution time data structure based at least in part on the execution time.

16. The apparatus of claim 15 wherein a sum of the second queue time and the second amount of time is greater than a sum of the first queue time and the adjusted first amount of time.

17. A computer program product comprising a non-transitory processor-readable storage medium having stored therein program code of one or more software programs, wherein the program code, when executed by at least one processing device comprising a processor coupled to a memory, causes the at least one processing device:
   to obtain a first task;
   to queue the first task in a queue of tasks to be executed by the at least one processing device, the queuing of the first task comprising:
      determining that the first task has a first task type of a plurality of task types;
      determining a first priority of execution time modifier for the first task based at least in part on the first task type; and
      adding the first task to the queue with a first priority of execution time, the first priority of execution time being determined based at least in part on the first priority of execution time modifier and a first queue time at which the first task is added to the queue;
   to obtain a second task;
   to queue the second task in the queue of tasks, the queuing of the second task comprising:
      determining that the second task has a second task type of the plurality of task types;
      determining a second priority of execution time modifier for the second task based at least in part on the second task type; and
      adding the second task to the queue with a second priority of execution time, the second priority of execution time being determined based at least in part on the second priority of execution time modifier and a second queue time at which the second task is added to the queue;
   to execute the first task from the queue in accordance with the first priority of execution time; and
   to execute the second task from the queue in accordance with the second priority of execution time;
   wherein the second priority of execution time is earlier than the first priority of execution time; and
   wherein the second queue time is later than the first queue time.

18. The computer program product of claim 17 wherein determining the first priority of execution time modifier comprises:
   identifying an entry of a plurality of entries in a priority of execution time data structure based at least in part on the first task type, the plurality of entries each comprising a given task type of the plurality of task types and given priority of execution time modifier corresponding to the given task type; and
   determining the first priority of execution time modifier based at least in part on the identified entry.

19. The computer program product of claim 17 wherein:
   the first priority of execution time modifier comprises a first amount of time to delay the execution of the first task from the first queue time;
   the second priority of execution time modifier comprises a second amount of time to delay the execution of the second task from the second queue time;
   the second amount of time is less than the first amount of time; and
   wherein a sum of the second queue time and the second amount of time is less than a sum of the first queue time and the first amount of time.

20. The computer program product of claim 19 wherein:
   the program code further causes the at least one processing device:
      to determine an execution time at which the first task is executed by the at least one processing device; and
      to adjust the first amount of time of the first priority of execution time modifier in a priority of execution time data structure based at least in part on the execution time; and
   wherein a sum of the second queue time and the second amount of time is greater than a sum of the first queue time and the adjusted first amount of time.

* * * * *